United States Patent
Jansen

(10) Patent No.: US 9,758,043 B2
(45) Date of Patent: Sep. 12, 2017

(54) METHOD FOR OPERATING AN ENERGY SUPPLY UNIT FOR A MOTOR VEHICLE ELECTRICAL SYSTEM

(71) Applicant: Robert Bosch GmbH, Stuttgart (DE)

(72) Inventor: Sebastian Jansen, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 188 days.

(21) Appl. No.: 14/228,778

(22) Filed: Mar. 28, 2014

(65) Prior Publication Data

US 2014/0306631 A1    Oct. 16, 2014

(30) Foreign Application Priority Data

Apr. 10, 2013  (DE) .................. 10 2013 206 296

(51) Int. Cl.
  *H02P 1/00* (2006.01)
  *B60L 1/00* (2006.01)
  *H02M 3/00* (2006.01)
  *H02P 9/00* (2006.01)
  *B60L 11/18* (2006.01)
  *H02M 7/219* (2006.01)
  *B60R 16/03* (2006.01)
  (Continued)

(52) U.S. Cl.
  CPC ............. *B60L 1/00* (2013.01); *B60L 11/1868* (2013.01); *B60R 16/03* (2013.01); *H02J 1/08* (2013.01); *H02J 7/1423* (2013.01); *H02M 3/00* (2013.01); *H02M 7/219* (2013.01); *H02P 9/00* (2013.01); *H02P 9/307* (2013.01); *H02P 9/48* (2013.01); *B60L 2210/12* (2013.01);
  *B60L 2210/40* (2013.01); *B60L 2240/526* (2013.01); *H02J 2001/008* (2013.01); *H02M 2001/009* (2013.01); *Y02T 10/642* (2013.01); *Y02T 10/7005* (2013.01); *Y02T 10/7066* (2013.01); *Y02T 10/7233* (2013.01); *Y02T 10/7241* (2013.01)

(58) Field of Classification Search
  CPC .. Y02T 10/7005; Y02T 10/7077; Y02T 10/70
  USPC .................. 318/139, 798, 800, 801
  See application file for complete search history.

(56) References Cited

U.S. PATENT DOCUMENTS 7,476,987 B2 *  1/2009  Chang ................. H02J 3/28
                                                290/44
7,948,221 B2 *  5/2011  Watanabe ............. H02M 3/158
                                                307/110

(Continued)

*Primary Examiner* — Rina Duda
(74) *Attorney, Agent, or Firm* — Norton Rose Fulbright US LLP; Gerard Messina

(57) ABSTRACT

A method for operating an energy supply unit for a motor vehicle electrical system, including at least one first subsystem and one second subsystem having different voltage levels, the energy supply unit including an electric machine which is connected via a converter circuit to the first subsystem and the second subsystem. In a first operating mode, a switchable switch element of the converter circuit which connects the converter circuit to the second subsystem is opened, the converter circuit is activated as an inverter circuit and the electric machine is motor or generator operated. In a second operating mode, the switchable switch element of the converter circuit is closed, the converter circuit is activated as a DC-DC converter and the DC-DC conversion takes place between the voltage levels of the first and the second subsystem.

15 Claims, 7 Drawing Sheets

(51) Int. Cl.
*H02J 7/14* (2006.01)
*H02P 9/30* (2006.01)
*H02P 9/48* (2006.01)
*H02J 1/08* (2006.01)
*H02M 1/00* (2006.01)
*H02J 1/00* (2006.01)

(56) References Cited

U.S. PATENT DOCUMENTS

| | | | | |
|---|---|---|---|---|
| 8,026,638 B2* | 9/2011 | King | ................... | B60L 11/1861 |
| | | | | 307/45 |
| 8,080,973 B2* | 12/2011 | King | ................... | B60L 11/1803 |
| | | | | 320/104 |
| 2011/0133677 A1* | 6/2011 | Franke | ................ | B60L 11/1887 |
| | | | | 318/400.3 |
| 2011/0309779 A1* | 12/2011 | Hiti | ....................... | B60L 3/0061 |
| | | | | 318/400.27 |
| 2012/0126728 A1* | 5/2012 | El-Refaie | ........... | H02K 11/0073 |
| | | | | 318/139 |
| 2013/0106187 A1* | 5/2013 | Gemin | ...................... | B60L 7/14 |
| | | | | 307/43 |
| 2013/0278194 A1* | 10/2013 | Numakura | ............... | B60L 3/003 |
| | | | | 318/400.27 |
| 2014/0070736 A1* | 3/2014 | Gorka | .................. | B60L 11/005 |
| | | | | 318/139 |

* cited by examiner

METHOD FOR OPERATING AN ENERGY SUPPLY UNIT FOR A MOTOR VEHICLE ELECTRICAL SYSTEM

RELATED APPLICATION INFORMATION

The present application claims priority to and the benefit of German patent application No. 10 2013 206 296.6, which was filed in Germany on Apr. 10, 2013, the disclosure of which is incorporated herein by reference.

FIELD OF THE INVENTION

The present invention relates to a method for operating an energy supply unit for a motor vehicle electrical system, including at least one first subsystem and one second subsystem having different voltage levels.

BACKGROUND INFORMATION

Motor vehicle electrical systems may be configured as so-called two-voltage or multi-voltage vehicle electrical systems including at least two subsystems. Such electrical systems are used, for example, when consumers having different power requirements exist in a particular motor vehicle. In this case, at least two of the subsystems have different voltage levels, for example, 14 V (a so-called low-voltage subsystem) and 48 V (a so-called high-voltage subsystem). The subsystems may be connected to each other, for example via a DC-DC converter. At least one of the subsystems has a generator system that feeds the subsystem. A second or additional subsystem connected via the mentioned DC-DC converter may then in turn be supplied from the subsystem having the generator system.

Electric machines may be used, in particular, in hybrid vehicles in order to be motor operated as well as generator operated. The internal combustion engine may be assisted by a motor operation of the electric machine at low rotational speeds at which the former does not yet deliver its full torque. Upon deceleration of the motor vehicle, kinetic energy may then be converted into electrical energy by the generator operation of the electric machine.

During generator operation, the electric machine generates, if necessary, a polyphase current which may be rectified for a motor vehicle electrical system. To enable both motor operation as well as generator operation of the electric machine, the electric machine may be equipped with an inverter circuit which may be composed, for example, of electrical switches, for example, in the form of MOSFETs, an associated control circuit and an intermediate capacitance. To ensure high performances in both motor as well as generator operation of the electric machine, the electric machine may be operated with, or it may supply, the comparatively high, first voltage of the high voltage subsystem.

However, the use of both an inverter circuit and a DC-DC converter in this configuration is cumbersome and is associated with high costs. Moreover, the separate circuits of the inverter circuit and the DC-DC converter put a strain on the already severely limited installation space in a motor vehicle.

It is therefore desirable to provide a simple, cost-efficient and space-saving option for enabling both a generator as well as a motor operation of an electric machine in conjunction with different subsystems of the motor vehicle electrical system.

SUMMARY OF THE INVENTION

The present invention provides a method for operating an energy supply unit for a motor vehicle electrical system having the features described herein. Advantageous embodiments are the subject matter of the further descriptions, as well as the following description.

The energy supply unit includes an electric machine to which an inverter circuit is connected which, in turn, is connected to one first subsystem and via a switch element to one second subsystem of a multi-voltage vehicle electrical system. Through the use according to the present invention of the converter circuit equipped with such a switch element, the energy supply unit may be operated or activated in a first operating mode as an inverter circuit. In this case the converter circuit has the same functions and advantages as a conventional inverter circuit and, in particular, may be configured analogously to a conventional inverter circuit. This makes possible both a generator operation of the electric machine, the electric machine supplying the first subsystem of the motor vehicle electrical system, as well as a motor operation of the electric machine, the electric machine being supplied from the first subsystem.

In a second operating mode the converter circuit is operated or activated as a DC-DC converter. In this case the same components of the converter circuit and, if necessary, the electric machine are used and are activated in such a way that a DC-DC conversion takes place between the voltage levels of the first subsystem and the second subsystem. According to the present invention, the already existing parts and components of the converter circuit which, in particular, are those of a conventional inverter circuit, are accordingly also used for the DC-DC conversion. Therefore, no additional components and parts are required and the costs may be reduced. The costs of integration and space requirements are also reduced.

Accordingly, the energy supply unit according to the present invention enables both a generator operation as well as a motor operation of the electric machine and enables the operation of multiple subsystems of the motor vehicle electrical system. Thus, the energy supply unit according to the present invention combines the advantages and functions of an inverter circuit and a DC-DC converter in one single circuit.

A processing unit used for activating the converter circuit, including, for example, a microcontroller, may be used for controlling the rectification and the inversion as well as for controlling the DC-DC conversion. Moreover, this enables the electric machine to transfer electrical power directly into the first subsystem as well as into the second subsystem. This is particularly advantageous during an emergency operation of the generator in the event of a battery failure.

The present invention is particularly suited for electric machines, for example, a separately excited synchronous machine for use in motor vehicles. The principle may be employed in connection with a boost recuperation system (BRS) in the electric machine (boost recuperation machine).

A processing unit according to the present invention, for example, a control unit of a motor vehicle, is programmed, in particular, to carry out a method according to the present invention. The processing unit, together with the electric machine, which may form a structural unit in order to collectively form an "intelligent" electric machine.

The implementation of the method in the form of software is also advantageous, since this entails particularly low costs, in particular if a performing control unit is also used for other tasks and is therefore present anyway. Suitable data media for providing the computer program are, in particular, diskettes, hard-disk drives, flash memories, EEPROMs, CD-ROMs, DVDs and the like. It is also possible to download a program from computer networks (Internet, Intranet etc.).

Further advantages and embodiments of the present invention result from the description and the appended drawing.

It is understood that the features cited above and those to be explained below are applicable not only in each specified combination, but also in other combinations or alone, without departing from the scope of the present invention.

The present invention is schematically represented in the drawing based on exemplary embodiments and is described in greater detail below with reference to the drawings.

DETAILED DESCRIPTION

Figure 1:
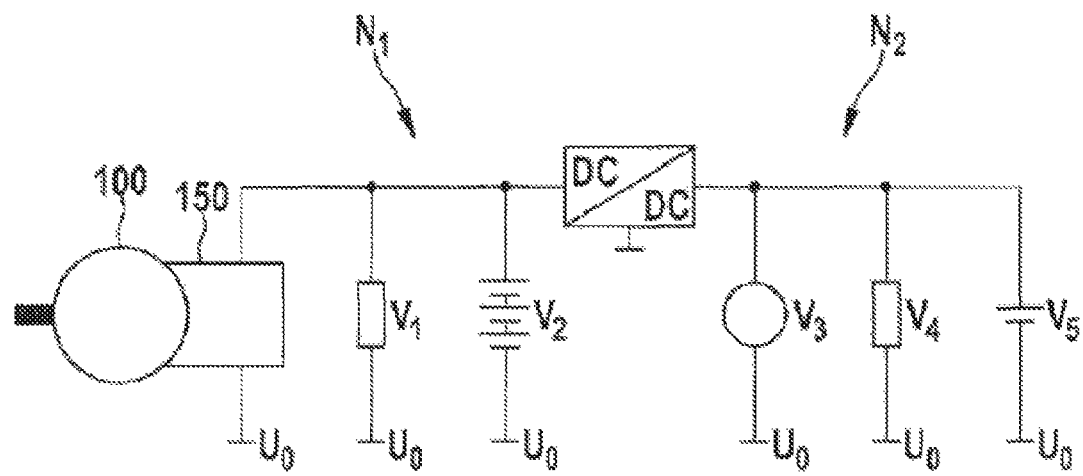
FIG. 1 schematically shows one specific embodiment of a multi-voltage vehicle electrical system having an energy supply unit according to the related art.

Corresponding elements are denoted by identical reference numerals. For the sake of clarity, these will not be repeatedly explained.

FIG. 1 schematically shows one specific embodiment of a multi-voltage vehicle electrical system having an energy supply unit of a motor vehicle electrical system according to the related art. In this example, the motor vehicle is configured as a hybrid vehicle. Connected downstream from an electric machine 100 is an inverter circuit 150. In this example, electric machine 100 is intended to be configured as a three-phase electric machine. Inverter circuit 150 is used to rectify a multiphase current, in this example, a three-phase current which is provided by electric machine 100 during a generator operation. In addition, inverter circuit 150 enables a conversion of a rectified current into a three-phase current in order to operate electric machine 100 in a motor mode.

During the generator operation of electric machine 100, inverter circuit 150 provides a first subsystem d.c. voltage of, for example, 48 V for a first subsystem $N_1$ of the motor vehicle electrical system. With the aid of this first subsystem d.c. voltage, it is possible to operate multiple electrical consumers, which are represented symbolically in FIG. 1 and designated as $V_1$ and $V_2$. Such an electrical consumer may, for example, be an electric drive of the hybrid vehicle or an energy store represented as $V_2$.

Since most electrical components in the hybrid vehicle, such as a starter motor of an internal combustion engine, a car radio or an on-board computer, are operated with a lower voltage than the first subsystem d.c. voltage, the first subsystem d.c. voltage is reduced by a DC-DC converter to a second subsystem d.c. voltage, for example, 14 V, for a second subsystem $N_2$. Electrical components which are operated with the second subsystem d.c. voltage are represented symbolically in FIG. 1 and designated as $V_3$, $V_4$ and $V_5$.

The voltage values 48 V and 14 V used are merely examples. The present invention may also be used in conjunction with other voltages or voltages varying over time.

Figure 2:
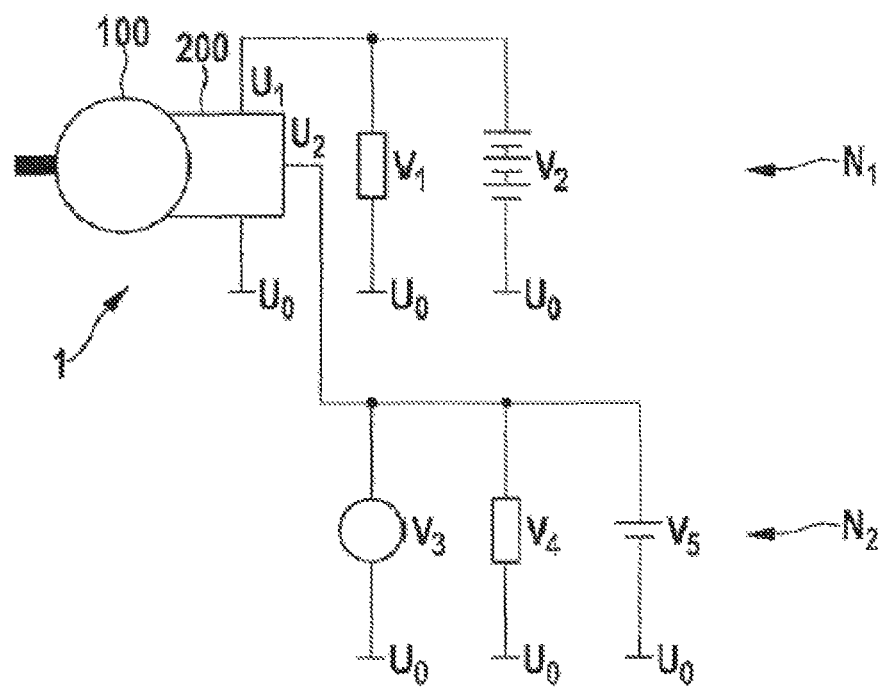
FIG. 2 shows one specific embodiment of a multi-voltage vehicle electrical system having an energy supply unit which is configured to carry out one specific embodiment of a method according to the present invention.

FIG. 2 schematically shows one specific embodiment of a multi-voltage vehicle electrical system having an energy supply unit 1, which is configured to carry out one specific embodiment of a method according to the present invention. Connected downstream from an electric machine 100 is a converter circuit 200. Converter circuit 200 is used, on the one hand, as an inverter circuit in order to provide the first subsystem d.c. voltage at a first d.c. voltage terminal $U_1$, with which electric components $V_1$ and $V_2$ may be operated.

Converter circuit 200 is used, on the other hand, as a DC-DC converter in order to transform the first subsystem d.c. voltage into the second subsystem d.c. voltage, with which components $V_3$, $V_4$, $V_5$ are operated, and to provide the second subsystem d.c. voltage at second d.c. voltage terminal $U_2$. In addition, inverter circuit 150 may transfer electrical energy between the two motor vehicle electrical systems with the first subsystem d.c. voltage and with the second subsystem d.c. voltage.

Figure 3:
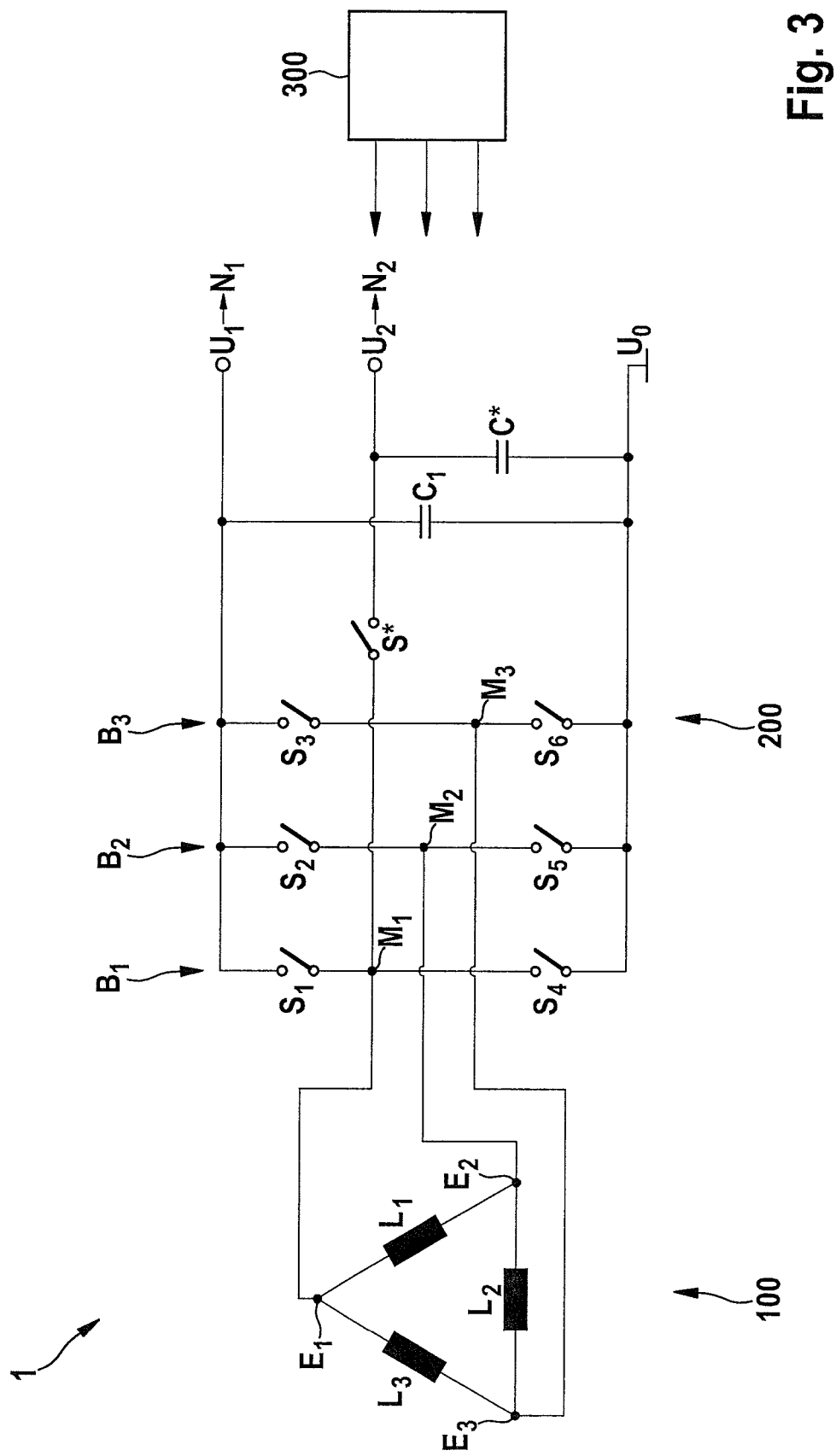
FIG. 3 shows in a circuit diagram-like manner one specific embodiment of an energy supply unit which is configured to carry out one specific embodiment of a method according to the present invention.

Energy supply unit 1 and a specific embodiment of a method according to the present invention for operating energy supply unit 1 are described with reference to FIG. 3.

Electric machine 100 in this example is configured as a three-phase electric machine. Stator inductances (phases) $L_1$, $L_2$ and $L_3$ of electric machine 100 are connected to a delta circuit. It may be noted that electric machine 100 includes still other components, for example, a rotor or an excitation winding, which for the sake of clarity are not shown.

Converter circuit 200 includes three half bridges $B_1$, $B_2$ and $B_3$. Each of the three half bridges $B_1$, $B_2$ and $B_3$ includes two switches $S_1$, $S_4$ and $S_2$, $S_5$, and $S_3$, $S_6$, respectively. Switches $S_1$ through $S_6$ may be configured as MOSFETs, for example. Each half bridge $B_1$, $B_2$ and $B_3$ includes in each case a center tap $M_1$, $M_2$ and $M_3$ between their two switches. Each of half bridges $B_1$, $B_2$ and $B_3$ is connected via its respective center tap $M_1$, $M_2$ and $M_3$ to one of the phase connections $E_1$, $E_2$ and $E_3$ of electric machine 100. Half bridges $B_1$, $B_2$ and $B_3$ are connected on the output side to a d.c. voltage terminal $U_1$ of first subsystem $N_1$ and an earth terminal $U_0$. In addition, an intermediate capacitance $C_1$ is connected in parallel to half bridges $B_1$, $B_2$ and $B_3$.

The above-described part of converter circuit 200 is configured analogously to an inverter circuit 150 according to the related art. The phases of electric machine 100 are energized as a result of the clocked switching of switches $S_1$ through $S_6$. During motor operation of electric machine 100, electrical power from first subsystem $N_1$ is converted into mechanical power by correspondingly activating switches $S_1$ through $S_6$. During generator operation, mechanical power is converted into electrical power and is delivered to first subsystem $N_1$.

In terms of the present invention, converter circuit 200 includes a switch element S* via which a center tap of one first half bridge of the half bridges is connected to a second d.c. voltage terminal $U_2$ of second subsystem $N_2$. In this specific case, switch element S* is connected to center tap $M_1$ of half bridge B. In addition, a smoothing capacitor C* is connected on the output side in parallel between second d.c. voltage terminal $U_2$ and earth terminal $U_0$.

With the advantageous use of switch element S*, it is possible to use converter circuit 200 not only as an inverter circuit, but as a DC-DC converter as well. In this arrangement, electrical power may be transferred from first subsystem $N_1$ into second subsystem $N_2$ and vice versa.

If switch element S* is opened, converter circuit 200 is then used as an inverter circuit and the first subsystem d.c. voltage is provided between first d.c. voltage terminal $U_1$ and earth terminal $U_0$.

If switch element S* is closed, the second subsystem d.c. voltage is then provided between second d.c. voltage terminal $U_2$ and earth terminal $U_0$. In this case, smoothing capacitor C* as well as two advantageously activated switches of switches $S_1$ through $S_6$ form a DC-DC converter.

Advantageously, the two switches of one of the half bridges which are not connected to switch element S* are selected and activated. A charge phase alternates with a discharge phase of a coil as a result of the clocked activation of the respective switches.

This coil is advantageously configured as one of the three stator inductances $L_1$, $L_2$, $L_3$ of electric machine 100. Thus, it is not necessary to integrate an additional coil into energy supply unit 1, and no additional components are required. Already existing stator windings $L_1$ through $L_3$ of electric machine 100 are accordingly used as a coil of this DC-DC converter.

Shown in addition to energy supply unit 1 is a processor unit which is configured, in particular, as a control unit 300 of the vehicle, which is programmed to carry out a specific embodiment of a method according to the present invention. Control unit 300 controls the activation of electric machine 100 and converter circuit 200 in general, and of the individual parts and the switching of individual switches $S_1$ through $S_6$ and of switch element S* in particular. Processor unit 300 is a component of electric machine 100 and together with the latter and converter circuit 200 forms a structural unit.

The activation of the respective switches and the charge phase and discharge phase are explained with reference to FIGS. 4 and 5. FIGS. 4a and 4b show energy supply unit 1 from FIG. 3. For the sake of clarity, only those reference numerals are shown in FIGS. 4a and 4b which are of significance for the charge phase and the discharge phase. In the example in FIG. 4, switches $S_2$ and $S_5$ of half bridges $B_2$ are activated. Switches $S_2$ and $S_5$, smoothing capacitor C* and stator winding $L_1$ are used as a DC-DC converter.

Figure 4A:
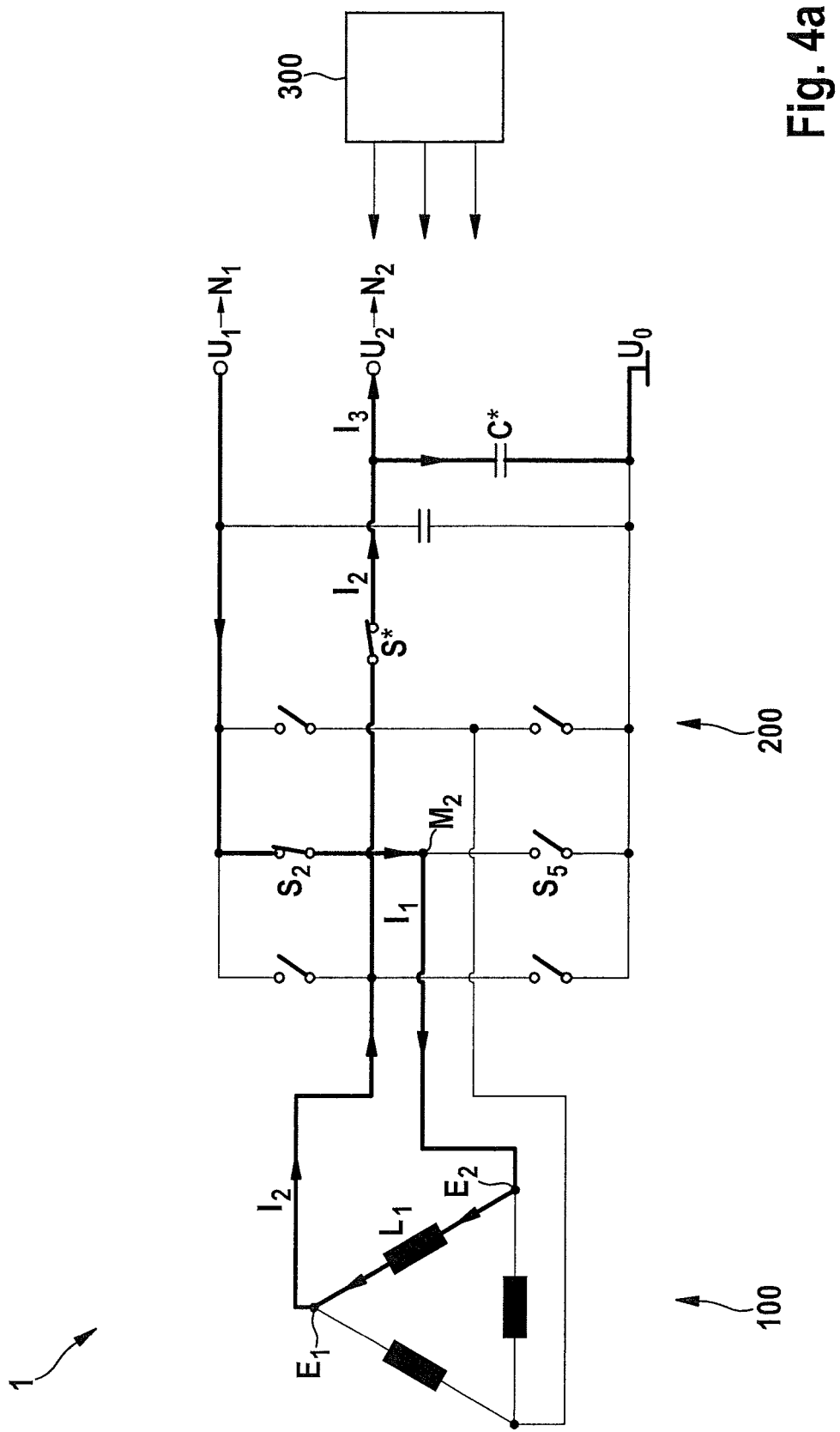
FIG. 4 shows in a circuit diagram-like manner a charge phase (FIG. 4a) and a discharge phase (FIG. 4b) of a DC-DC conversion of an energy supply unit according to one specific embodiment of a method according to the present invention.

The charge phase of energy supply unit 1 is shown in FIG. 4a. Current-carrying conductors are highlighted in bold. In this example, switch element S* and switch $S_2$ are closed; the remaining switches are opened. A current having a current intensity $I_1$ may flow from first d.c. voltage terminal $U_1$ via switch $S_2$, center tap $M_2$, and phase connection $E_2$ to stator inductance $L_1$ of electric machine 100. A current having a current intensity $I_2$ flows from stator inductance $L_1$ via phase connection $E_1$ and switch element S* into smoothing capacitor C*. A current having a current intensity $I_3$ flows to second d.c. voltage terminal $U_2$. Stator inductance $L_1$ is charged in this charge phase.

Figure 4B:
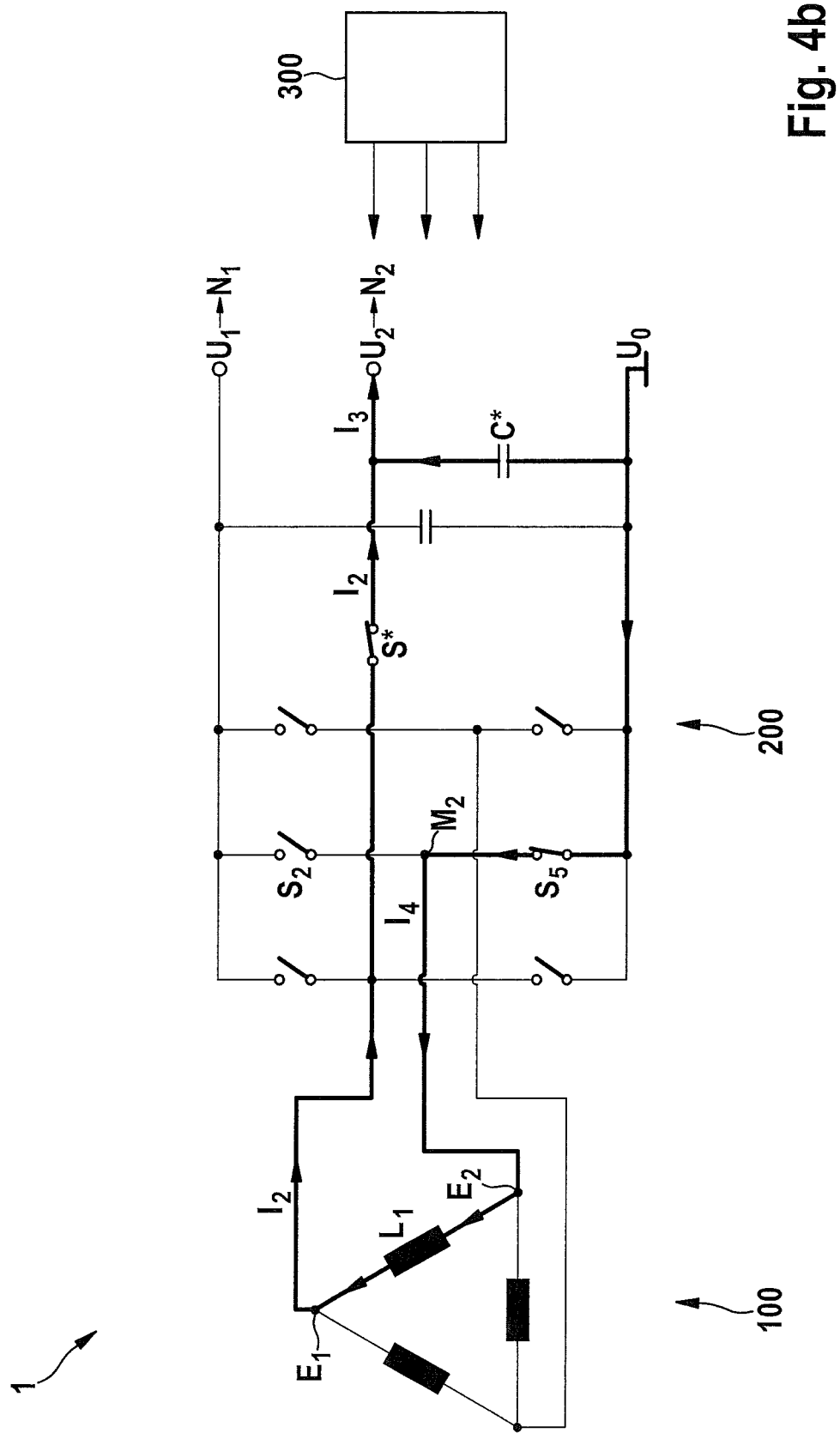

Shown in FIG. 4b is the discharge phase of energy supply unit 1. In this case, switch $S_2$ is opened and switch $S_5$ is closed. Switch element S* remains closed; the remaining switches are opened. The first subsystem d.c. voltage of first subsystem $N_1$ is no longer present at stator inductance $L_1$. Stator inductance $L_1$ maintains the current flow and then discharges. A current having a current intensity $I_4$ flows from earth terminal $U_0$ via switch $S_5$, center tap $M_2$ and phase connection $E_2$ to stator inductance L. The current having current intensity $I_2$ or $I_3$ flows analogously to FIG. 4a.

The second subsystem d.c. voltage of second subsystem $N_2$ occurring at second d.c. voltage terminal $U_2$ may be controlled by the ratio of the durations of the charge phase and the discharge phase and therefore by clocked activation of switches $S_2$ and $S_5$. Smoothing capacitor C* is used to smooth the second subsystem d.c. voltage.

Figure 5:
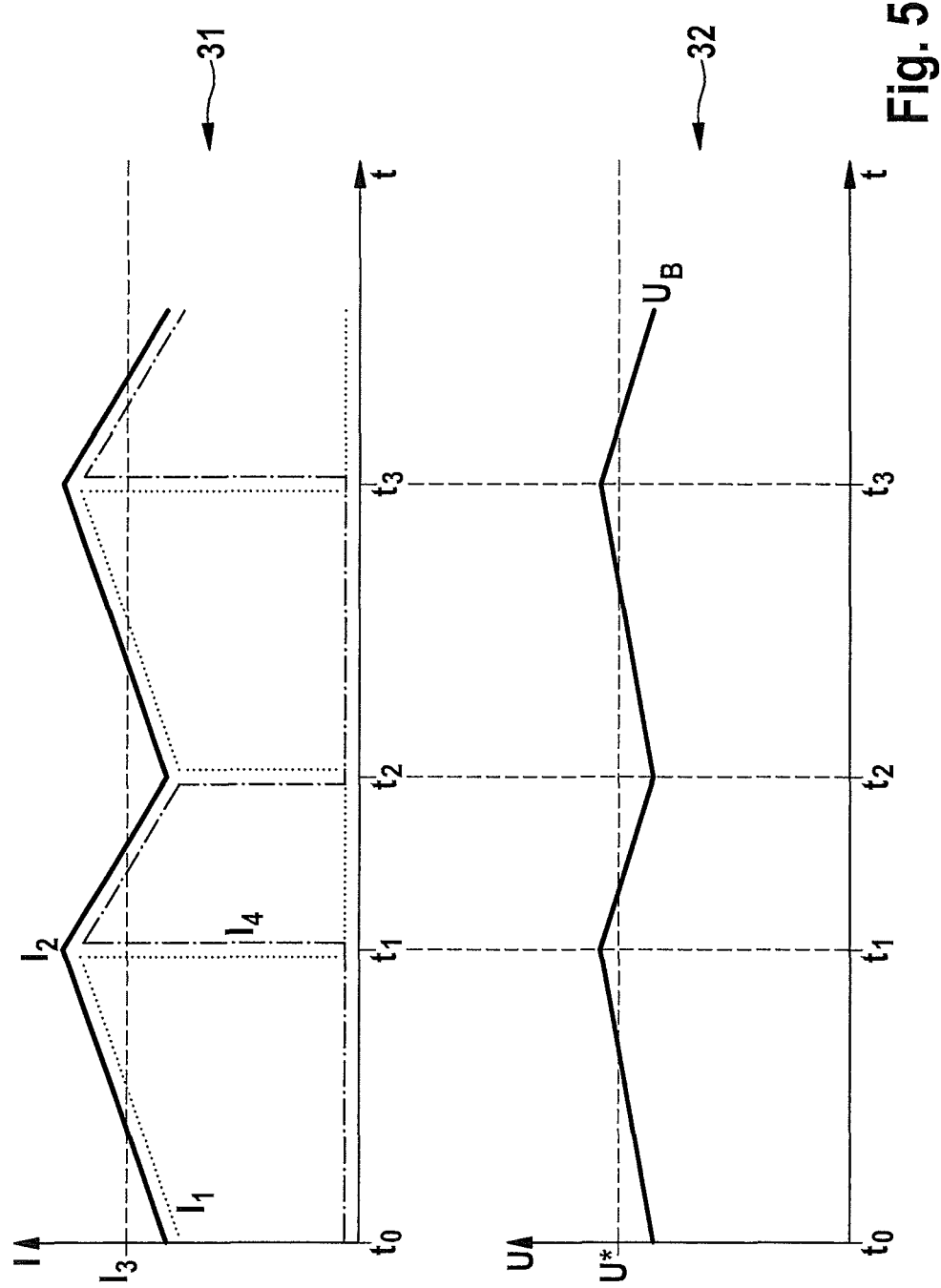
FIG. 5 schematically shows two diagrams which may be determined in the course of a charge phase and a discharge phase of a DC-DC conversion of an energy supply unit according to one specific embodiment of a method according to the present invention.

In upper diagram 31 in FIG. 5 a curve of a current intensity I is plotted against time t. At point in time $t_0$, the charge phase begins, switch $S_2$ is closed and switch $S_5$ is opened. In this case, the dotted line describes the current having current intensity $I_1$. At point in time $t_1$, the discharge phase begins, switch $S_2$ is opened and switch $S_5$ is closed. The current having current intensity $I_1$ is no longer able to flow. Since stator inductance $L_1$ maintains the current flow, the current having current intensity $I_4$ described by the dashed-dotted line now flows. At point in time $t_2$, the charge phase begins again, analogously to point in time $t_0$. At point in time $t_3$, the discharge phase begins again, analogously to point in time $t_1$. The solid line describes the current having current intensity $I_2$ which flows during the charge phase as well as during the discharge phase. The dashed line describes the current having current intensity $I_3$ which flows to second d.c. voltage terminal $U_2$ during the charge phase and the discharge phase. Current intensity $I_3$ may be held essentially constant during the charge phase and the discharge phase by smoothing capacitor C*.

In diagram 32 a curve of a voltage U is plotted against time t. The second subsystem d.c. voltage provided at second d.c. voltage terminal $U_2$ during the charge phase and the discharge phase is represented as a solid line and denoted by $U_B$. The dashed line describes a voltage setpoint value U* of the second subsystem d.c. voltage, for example, 14 V. Second subsystem d.c. voltage $U_B$ is smoothed by smoothing capacitor C* so that the voltage value of second subsystem d.c. voltage $U_B$ differs only negligibly from voltage setpoint value U* during the charge phase and the discharge phase.

It is also conceivable to connect a free-wheeling diode in parallel to switch $S_5$. In this case, clocked activation of switch $S_5$ is not necessary. If switch $S_5$ is configured as a MOSFET, for example, then such a free-wheeling diode is present as a matter of principle. By analogy, this applies to switches $S_4$ and $S_6$.

A reversal of the direction of the power flow, i.e., a power transfer from the second subsystem d.c. voltage to the first subsystem d.c. voltage, may be achieved by closing switch element S* and by contrastingly opening and closing switches $S_2$ and $S_5$.

Figure 6:
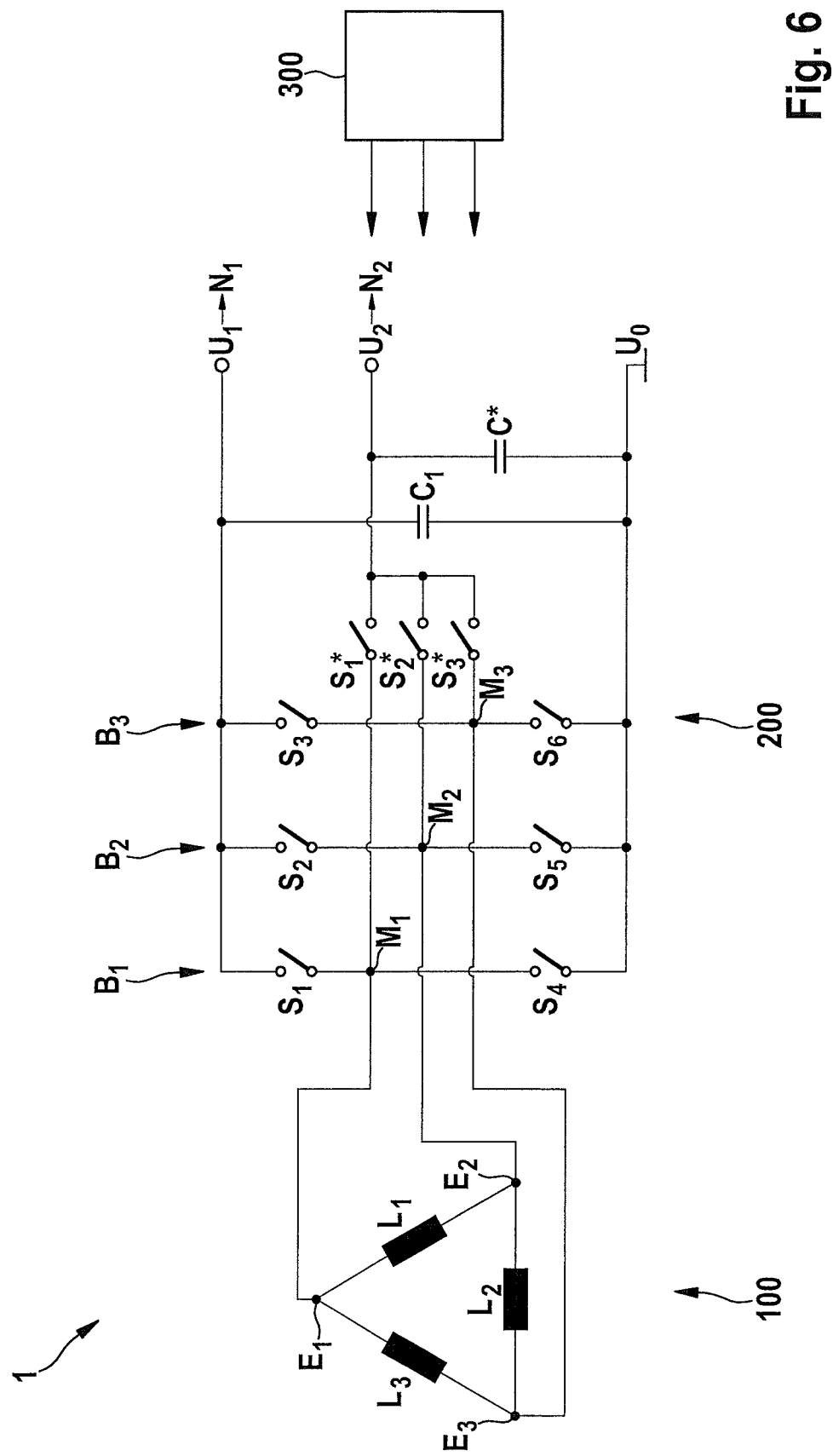
FIG. 6 shows in a circuit diagram-like manner one specific embodiment of an energy supply unit having three switch elements, which is configured to carry out another specific embodiment of a method according to the present invention.

FIG. 6 schematically shows another embodiment of an energy supply unit 1, which is configured to carry out another specific embodiment of a method according to the present invention.

The present invention is not limited to a switchable switch element. A converter circuit 200 may also include multiple switchable switch elements. In this configuration in FIG. 6 each of the 3 half bridges $B_1$, $B_2$ and $B_3$ is connected in each case via their center tap $M_1$, $M_2$ and $M_3$ to second d.c. voltage terminal $U_2$, in each case via a switch element $S_1^*$, $S_2^*$ and $S_3^*$. Each of the phase connections $E_1$, $E_2$ and $E_3$ is connected therefore in each case via a switch element $S_1^*$, $S_2^*$ and $S_3^*$ to second d.c. voltage terminal $U_2$.

In this way, the power to be transferred may be uniformly distributed to switches $S_1$ through $S_6$ and to stator inductances $L_1$ through $L_3$ in such a way that the thermal stresses on the individual parts resulting from power dissipation is reduced. Switch elements $S_1^*$ through $S_3^*$ are closed at staggered intervals. While one of switch elements $S_1^*$ through $S_3^*$ is closed, the switch pair of one of the half bridges not connected to the closed switch element is activated in accordance with the principle described above. If, for example, switch element $S_3^*$ is closed, switches $S_1$ and $S_4$ of half bridge $B_1$ or switch $S_2$ and $S_5$ of half bridge $B_2$ may be activated.

In this way, the switches may be "rollingly" activated so that their thermal stress is reduced. Another advantage of this arrangement is that it is possible to operate energy supply unit 1 directly with both first subsystem $N_1$ as well as with second subsystem $N_2$. In phases of continuous generator supply of second subsystem $N_2$, the additional voltage transformation is therefore omitted, as a result of which power losses may be reduced.

Figure 7:
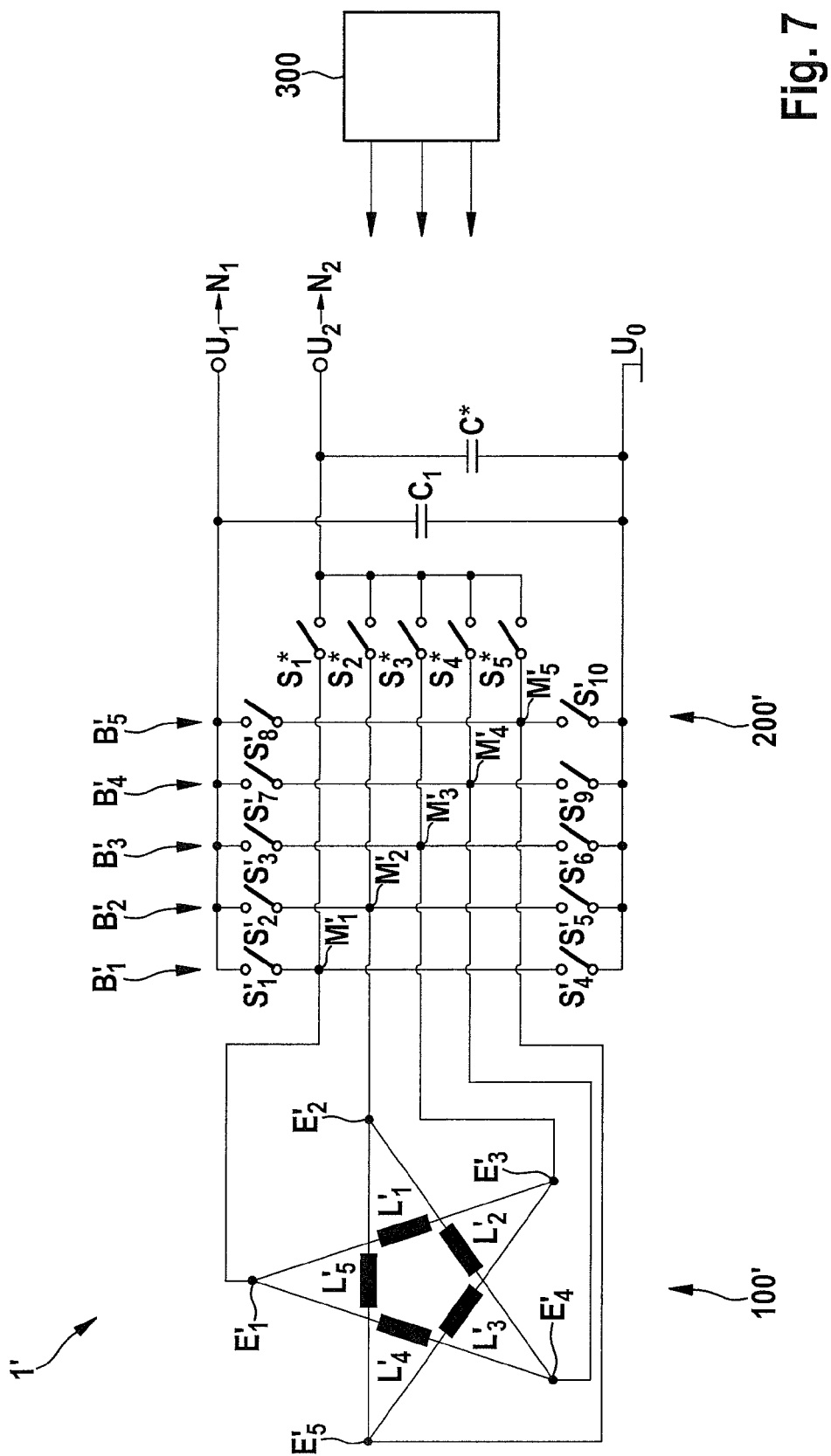
FIG. 7 shows in a circuit diagram-like manner another specific embodiment of an energy supply unit having a five-phase electric machine which is configured to carry out another specific embodiment of a method according to the present invention.

FIG. 7 schematically shows another embodiment of an energy supply unit 1 which is configured to carry out one specific embodiment of a method according to the present invention.

The use of the present invention is not limited to 3-phase electric machines. FIG. 7 shows an energy supply unit 1' according to the present invention having a 5-phase electric machine 100' including five stator inductances $L_1'$, $L_2'$, $L_3'$, $L_4'$ and $L_5'$. In this example, the 5-phase electric machine 100' is configured as a drude's foot circuit.

Converter circuit 200' includes five half bridges $B_1'$, $B_2'$, $B_3'$, $B_4'$ and $B_5'$. Each of the five half bridges $B_1'$ through $B_5'$ includes in each case two switches $S_1'$ through $S_{10}'$. Each of half bridges $B_1'$ through $B_5'$ is connected in each case via a center tap $M_1'$, $M_2'$, $M_3'$, $M_4'$ and $M_5'$ to a phase connection $E_1'$. $E_2'$, $E_3$, $E_4'$ and $E_5'$ of electric machine 100'.

Analogously to FIG. 4, each of phase connections $E_1'$, $E_2'$, $E_3$, $E_4'$ and $E_5'$ is connected via respective center tap $M_1'$, $M_2'$, $M_3'$, $M_4'$ and $M_5'$ of the associated half bridge $B_1'$, $B_2'$, $B_3'$, $B_4'$ and $B_5'$ to second d.c. voltage terminal $U_2$ via a switch element $S_1^*$, $S_2^*$, $S_3^*$, $S_4^*$ and $S_5^*$. The switches are activated analogously to the case of a three-phase electric machine 100 described above.

What is claimed is:

1. A method for operating a motor vehicle electrical system that includes (a) a circuit that includes a switch, (b) an electric machine, (c) a terminal to a first subsystem, and (d) a terminal to a second subsystem that operates at a different voltage level than the first subsystem, the method comprising:

in a first operating mode, in which the switch is closed, the circuit operating as a DC-DC converter that converts between the voltage levels of the first subsystem and the second subsystem by controlling a connection via the switch between the first and second subsystems, wherein the second subsystem is connectable to the electric machine via the switch when, and only when, the switch is closed, and the second subsystem is connectable to the first subsystem via the switch when, and only when, the switch is closed; and in a second operating mode, in which the switch is open and while the second subsystem is disconnected from the first subsystem and from the electric machine, the circuit operating the electric machine as a motor using electrical energy from the first subsystem connected to the electric machine via the circuit, and operating the electric machine as a generator to supply electrical energy to the first subsystem connected to the electric machine via the circuit.

2. The method of claim 1, wherein, in the first operating mode, the conversion between the voltage levels includes the circuit connecting the first subsystem to the second subsystem via the electric machine.

3. The method of claim 1, wherein, in the second operating mode, electrical power is transferred between the first subsystem and the electric machine via the circuit.

4. The method of claim 1, wherein, in the first operating mode, electrical power is transferred between the first subsystem and the second subsystem via the circuit activated as the DC-DC converter.

5. The method of claim 3, wherein the transferred electrical powers are controlled by clocked activation of switches of the circuit.

6. The method of claim 1, wherein, in the second operating mode, a multiphase output voltage of the electric machine is rectified into a first subsystem d.c. voltage of the first subsystem or the first subsystem d.c. voltage of the first subsystem is inverted into a multiphase voltage.

7. The method of claim 1, wherein, in the first operating mode, the first subsystem d.c. voltage of the first subsystem is transformed into a first subsystem d.c. voltage of the first subsystem via the circuit activated as the DC-DC converter, or the second subsystem d.c. voltage of the second subsystem is transformed into the first subsystem d.c. voltage of the first subsystem via the circuit activated as the DC-DC converter.

8. The method of claim 7, wherein voltage values of the transformed subsystem d.c. voltages are controlled by clocked activation of the switches of the circuit.

9. The method of claim 1, wherein, in the first operating mode, switches of the circuit and a stator inductance of the electric machine are operated as the DC-DC converter.

10. The method of claim 1, wherein the circuit includes at least two switchable switch elements, the at least two switchable switch elements being opened in the second operating mode, and the at least two switchable switches being closed in staggered intervals in the first operating mode.

11. The method of claim 10, wherein each of the at least two switchable switch elements is connected to a respective center tap of a respective half bridge of the circuit.

12. A processor unit, comprising:

an arrangement, wherein the arrangement is configured for operating a motor vehicle electrical system by performing the following:

(I) in a first operating mode, in which a switch of a circuit of the electrical system is closed, controlling the circuit to operate as a DC-DC converter that converts between (a) a first voltage level at which a first subsystem, a terminal to which is included in the electrical system, operates and (b) a second voltage level that is different than the first voltage level and at which a second subsystem, a terminal to which is included in the electrical system, operates, wherein:

the controlling of the circuit to operate as the DC-DC converter is by controlling a connection via the switch between the first and second subsystems; and the second subsystem is connectable to an electric machine of the electrical system via the switch when, and only when, the switch is closed, and the second subsystem is connectable to the first subsystem via the switch when, and only when, the switch is closed; and (II) in a second operating mode, in which the switch is open and while the second subsystem is disconnected from the first subsystem and from the electric machine, controlling the circuit to:

operate the electric machine as a motor using electrical energy from the first subsystem connected to the electric machine via the circuit; and operate the electric machine as a generator to supply electrical energy to the first subsystem connected to the electric machine via the circuit.

13. A non-transitory computer readable medium on which is stored a computer program that is executable by a processor and that, when executed by the processor, causes the processor to perform a method for operating a motor vehicle electrical system, the electrical system including (a) a circuit that includes a switch, (b) an electric machine, (c) a terminal to a first subsystem, and (d) a terminal to a second subsystem that operates at a different voltage level than the first subsystem, the method comprising performing the following:

in a first operating mode, in which the switch is closed, controlling the circuit to operate as a DC-DC converter that converts between the voltage levels of the first subsystem and the second subsystem by controlling a connection via the switch between the first and second subsystems, wherein the second subsystem is connectable to the electric machine via the switch when, and only when, the switch is closed, and the second subsystem is connectable to the first subsystem via the switch when, and only when, the switch is closed; and in a second operating mode, in which the switch is open and while the second subsystem is disconnected from the first subsystem and from the electric machine, controlling the circuit to:

operate the electric machine as a motor using electrical energy from the first subsystem connected to the electric machine via the circuit; and operate the electric machine as a generator to supply electrical energy to the first subsystem connected to the electric machine via the circuit.

14. The computer readable medium of claim 13, wherein, in the second operating mode, electrical power is transferred between the first subsystem and the electric machine via the circuit.

15. A vehicle electrical system, comprising:

a terminal to a first subsystems;

a terminal to a second subsystem that operates at a different voltage level than the first subsystem;

a circuit that includes a switch;

an electric machine; and a processor unit, wherein the processor unit is configured to operate the electrical system by performing the following:

in a first operating mode, in which the switch is closed, controlling the circuit to operate as a DC-DC converter that converts between the voltage levels of the first subsystem and the second subsystem by controlling a connection via the switch between the first and second subsystems, wherein the second subsystem is connectable to the electric machine via the switch when, and only when, the switch is closed, and the second subsystem is connectable to the first subsystem via the switch when, and only when, the switch is closed; and in a second operating mode, in which the switch is open and while the second subsystem is disconnected from the first subsystem and from the electric machine, controlling the circuit to:

operate the electric machine as a motor using electrical energy from the first subsystem connected to the electric machine via the circuit; and operate the electric machine as a generator to supply electrical energy to the first subsystem connected to the electric machine via the circuit.

* * * * *